US011269068B2

(12) United States Patent
Hustava et al.

(10) Patent No.: US 11,269,068 B2
(45) Date of Patent: Mar. 8, 2022

(54) DETECTION OF NOISE-INDUCED ULTRASONIC SENSOR BLINDNESS

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 436 days.

(21) Appl. No.: 16/254,882

(22) Filed: Jan. 23, 2019

(65) Prior Publication Data

US 2020/0233071 A1     Jul. 23, 2020

(51) Int. Cl.
*G01S 7/52*     (2006.01)

(52) U.S. Cl.
CPC . *G01S 7/52004* (2013.01); *G01S 2007/52009* (2013.01)

(58) Field of Classification Search
None
See application file for complete search history.

(56) References Cited

U.S. PATENT DOCUMENTS

| | | | | |
|---|---|---|---|---|
| 3,274,821 A | * | 9/1966 | Weighart | G01N 29/40 73/631 |
| 3,961,321 A | * | 6/1976 | Moss | G08B 13/1627 367/93 |
| 3,984,759 A | * | 10/1976 | St-Amant | G01V 3/02 324/362 |
| 4,099,876 A | * | 7/1978 | Dorsman | G01C 19/665 310/317 |
| 4,464,738 A | * | 8/1984 | Czajkowski | G01S 7/529 367/97 |

(Continued)

FOREIGN PATENT DOCUMENTS

| | | |
|---|---|---|
| DE | 10142075 A1 | 5/2002 |
| DE | 102005013589 A1 | 9/2006 |
| DE | 102012216968 A1 | 4/2014 |

OTHER PUBLICATIONS

U.S. Appl. No. 15/888,471, filed Feb. 5, 2018, Tomas Suchy et al., "Composite Acoustic Bursts for Multi-Channel Sensing," 30 pages.

(Continued)

*Primary Examiner* — Hovhannes Baghdasaryan
(74) *Attorney, Agent, or Firm* — Ramey & Schwaller, LLP

(57) ABSTRACT

Piezoelectric sensor controllers may facilitate detection and identification of various potential fault states including noise-induced sensor blindness. In one illustrative embodiment, a sensor controller includes: a transmitter to drive a piezoelectric element during actuation intervals to generate acoustic bursts; a receiver to sense a response of the piezoelectric element to echoes of each acoustic burst, the receiver including a front-end amplifier; a processing circuit coupled to the transmitter and to the receiver, the processing circuit operable to apply echo-detection processing to said response; and a blindness detector to detect saturation of the front-end amplifier during or prior to the measurement intervals.

17 Claims, 4 Drawing Sheets

(56) References Cited

U.S. PATENT DOCUMENTS

| | | | |
|---|---|---|---|
| 5,241,360 A * | 8/1993 | Key | G01S 17/36 |
| | | | 356/5.12 |
| 9,810,778 B2 | 11/2017 | Koudar et al. | |
| 2003/0115007 A1* | 6/2003 | Lipp | G01S 7/2813 |
| | | | 702/94 |
| 2007/0286609 A1* | 12/2007 | Ikram | H04B 10/564 |
| | | | 398/197 |
| 2009/0160692 A1* | 6/2009 | Fukuzawa | H03M 1/186 |
| | | | 341/155 |
| 2014/0304107 A1* | 10/2014 | McAllister | G06Q 30/0631 |
| | | | 705/26.7 |
| 2016/0233846 A1* | 8/2016 | Pavao-Moreira | G01S 7/032 |
| 2016/0266239 A1* | 9/2016 | Pavao-Moreira | G01S 7/4021 |
| 2017/0115382 A1 | 4/2017 | Koudar et al. | |
| 2018/0031701 A1 | 2/2018 | Hustava et al. | |
| 2018/0160226 A1 | 6/2018 | Hustava et al. | |

OTHER PUBLICATIONS

U.S. Appl. No. 16/005,031, filed Jun. 11, 2018, Marek Hustava et al., "Lin-Compatible Fast-Data Bus," 24 pages.
U.S. Appl. No. 15/888,543, filed Feb. 5, 2018, Jiri Kutej et al., "Response-Based Determination of Piezoelectric Transducer State," 39 pages.

* cited by examiner

DETECTION OF NOISE-INDUCED ULTRASONIC SENSOR BLINDNESS

BACKGROUND

Modern automobiles are equipped with an impressive number and variety of sensors. For example, cars are now routinely equipped with arrays of ultrasonic sensors to monitor distances between the car and any nearby persons, pets, vehicles, or obstacles. Due to environmental "noise" and safety concerns, each of the sensors may be asked to provide tens of measurements each second while the car is in motion. It is important for such sensor arrays to perform reliably or to alert the operator when their performance is suspect.

As the number of sensors increases, so too does the incidence rate of sensor failures and the importance of correctly diagnosing such failures so that the operator can be alerted and, if needed, suitable action can be taken to correct or accommodate the failure. Illustrative actions may include: repairing a broken or disconnected transducer, washing the car to remove mud or dirt from the sensor's surface, exercising caution while the transducer is impaired by snow or rain, and just ignoring a transient noise event when the sensor is otherwise operating correctly.

In commonly-owned U.S. application Ser. No. 15/888, 543, filed 2018 Feb. 5 and titled "Response-based determination of piezoelectric transducer state" by inventors J. Kutej, T. Suchy, M. Hustava, P. Horsky, and Z. Axman, which application is hereby incorporated herein by reference in its entirety, there are disclosed techniques for detecting various potential fault states of a piezoelectric transducer and for signaling the presence of any such detected fault states. However, at least one potential fault state has not been recognized in the foregoing application and the inventors are unaware of any existing system or reference that enables detection and reporting of this potential fault state. Nevertheless this potential fault state can silently blind the sensor. If this potential fault state is not recognized and diagnosed, the operator will be left ignorant of potential obstacles or hazards meant to be detected by the sensor.

SUMMARY

Accordingly, there are disclosed herein various sensors, sensor controllers, and sensor control methods with noise-induced blindness detection. In one illustrative embodiment, a sensor controller includes: a transmitter to drive a piezoelectric element during actuation intervals to generate acoustic bursts; a receiver to sense a response of the piezoelectric element to echoes of each acoustic burst, the receiver including a front-end amplifier; a processing circuit coupled to the transmitter and to the receiver, the processing circuit operable to apply echo-detection processing to said response; and a blindness detector to detect saturation of the front-end amplifier outside of the actuation intervals.

In an illustrative embodiment of a method for operating a piezoelectric-based sensor, the method includes: driving a piezoelectric transducer to generate a burst of acoustic energy during an actuation interval; during a measurement interval following the actuation interval, obtaining a response of the piezoelectric transducer with a receiver that includes a front-end amplifier; processing the response to sense echoes of the burst; and determining whether the response indicates sensor blindness due to saturation of the front-end amplifier.

An illustrative sensor embodiment includes: a piezoelectric transducer; and a controller that drives the piezoelectric transducer to generate bursts of acoustic energy during actuation intervals and that obtains responses of the piezoelectric transducer during measurement intervals with a receiver that includes a front-end amplifier, the controller including a blindness detector that detects saturation of the front-end amplifier outside of the actuation intervals.

Each of the foregoing embodiments may be employed together with any one or more of the following optional features: 1. the blindness detector includes: an envelope detector that measures a wideband envelope of the response during the measurement intervals; and a comparator that compares the wideband envelope to a threshold representing saturation of the front-end amplifier. 2. an I/O controller that communications wideband envelope measurements to a system controller for detection of sensor blindness. 3. an analog-to-digital converter subsequent to the front-end amplifier, the analog-to-digital converter providing a digital response signal. 4. a bandpass filter centered on a carrier frequency of the acoustic bursts to produce a filtered signal from the digital response signal. 5. a second envelope detector that measures a narrowband envelope of the filtered signal during a noise measurement interval prior to each actuation interval. 6. a second comparator that compares the narrowband envelope to a second threshold representing excessive environmental noise. 7. an I/O controller that communicates a sensor fault if the blindness detector detects saturation and/or if the second comparator detects excessive environmental noise during the noise measurement interval. 8. the blindness detector operates on the digital response signal. 9. the blindness detector operates on an analog output signal from the front-end amplifier. 10. employing a reverberation detector to signal an end of the actuation interval. 11. measuring a wideband envelope of the response; and comparing the wideband envelope to a threshold representing saturation of the front-end amplifier. 12. a reverberation detector that determines a beginning of each measurement interval.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
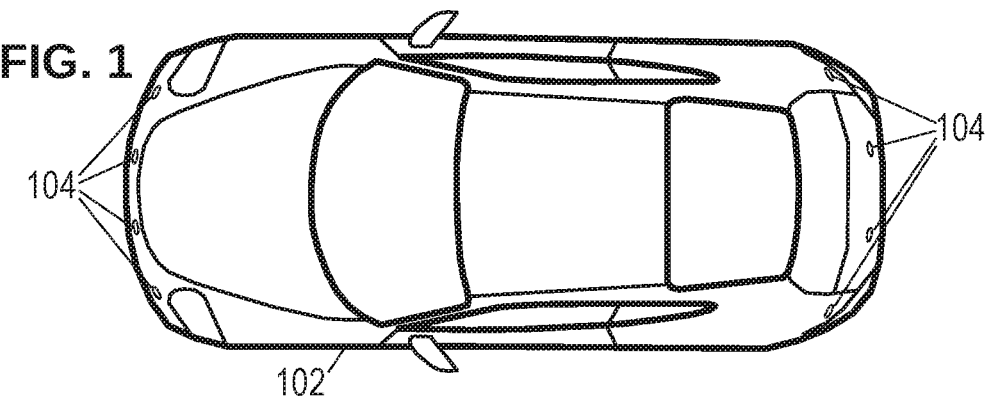
FIG. 1 is an overhead view of an illustrative vehicle equipped with parking-assist sensors.

As an illustrative usage context, FIG. 1 shows a vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting and measuring distances to objects in the various detection zones, potentially using the sensors for individual measurements as well as cooperative (e.g., triangulation, multi-receiver) measurements.

The ultrasonic sensors are transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported through the use of orthogonal waveforms or transmissions to non-overlapping detection zones.

Figure 2:
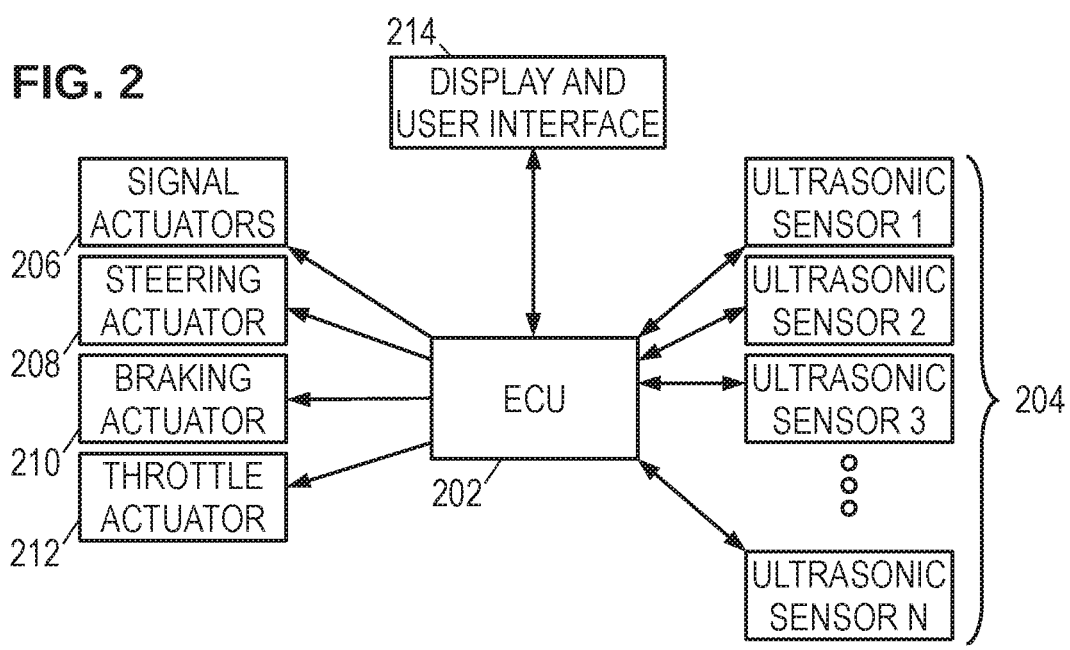
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

One potential sensor configuration is now described with reference to FIG. 3. (Other communication and power supply techniques such as those provided in the DSI3, LIN, and CAN standards, are also suitable and contemplated for use in accordance with the principles disclosed herein.) Besides the two power terminals (Vbat and GND) shown in the embodiment of FIG. 3, each of the illustrative ultrasonic sensors is only connected to the ECU 202 by a single input/output ("I/O" or "IO") line. The I/O line may be biased to the supply voltage (the "de-asserted" state) by a pull-up resistor when it is not actively driven low (the "asserted" state) by the ECU 202 or by the sensor controller 302. The communication protocol is designed to have only one of the two controllers (ECU 202 or sensor controller 302) asserting the I/O line at any given time.

The sensor controller 302 includes an I/O interface 303 that, when placed in a recessive mode, monitors the I/O line for assertion by the ECU 202 and, when placed in a dominant mode, drives the state of the I/O line. The ECU communicates a command to the sensor by asserting the I/O line, the different commands being represented by assertions of different lengths. The commands may include a "send and receive" command, a "receive only" command, and a "data mode" command.

The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element.

As used herein, the term "piezoelectric transducer" includes not only the piezoelectric element, but also the supporting circuit elements for tuning, driving, and sensing, the piezoelectric element. In the illustrative embodiment, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

A pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting. As the received echo signals are typically in the millivolt or microvolt range, a low-noise amplifier 308 (also referred to herein as a "front-end amplifier") amplifies the signal from the receive terminals. The amplified receive signal may be digitized and processed by a digital signal processor (DSP) 310 with an integrated analog-to-digital converter (ADC).

DSP 310 applies programmable methods to measure the actuation period of the piezoelectric transducer during the transmission of a burst (including the ensuing reverberation or "ringing" period), and to detect and measure the lengths of any received bursts or "echoes". Such methods may employ threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and quality factor, and may further detect transducer fault states as provided in detail below. Some fault states may be indicated by, e.g., an excessively short actuation period (which may be due to a disconnected or defective transducer, suppressed vibration, or the like), while others may be indicated by an excessively long actuation period (defective mounting, inadequate damping resistance, or the like). Still other fault states may be indicated by the presence of excessive noise during the non-transmit portions of the measurement cycle.

Commands received via the I/O line trigger the core logic 304 to operate the transmitter and receiver and provide the measurement results to the ECU 202 via the I/O line, as explained further below. In addition to the transducer fault states that may be detected by the DSP 310, the core logic may monitor other sensor error conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305.

Figure 4:
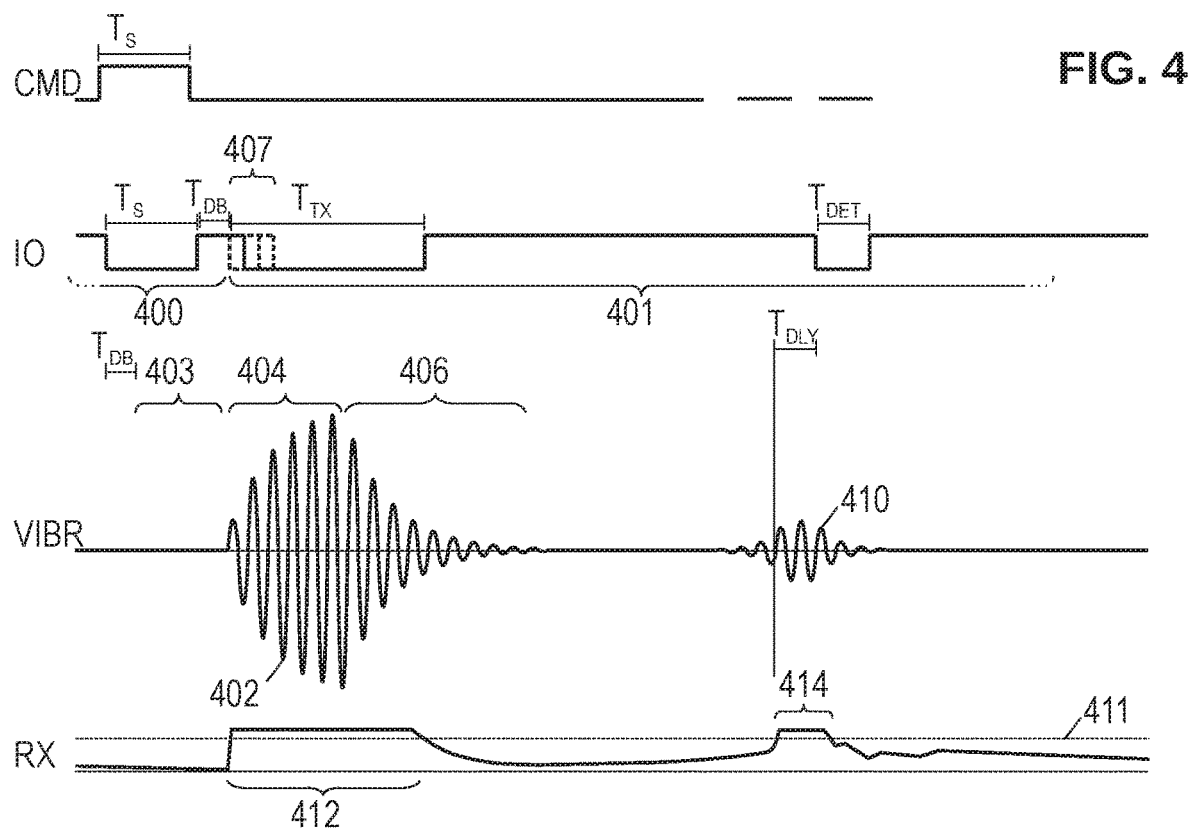
FIG. 4 is a graph relating controller input and output signals.

FIG. 4 provides some illustrative signal timing to aid in understanding the operation of the illustrative sensor embodiments, particularly with regard to communication on the I/O line. An ECU formulates a signal pulse "CMD" having a duration that represents a desired command. In this instance the duration is "Ts" to represent a "send and receive" command. (Illustrative command pulse durations may be in the 300-1300 microsecond range.) During a time 400 when the sensor is inactive (i.e., not performing a measurement or otherwise responding to a command from the ECU), the I/O line is high (de-asserted). During this time 400, the ECU is allowed to control the I/O line. The ECU asserts the IO signal by actively driving the line low for the duration representing the command. There is a small propagation delay due to limited slew rates on the I/O line, and a debounce interval ("$T_{DB}$") follows the assertion and de-assertion to ensure that the timing of line's return to battery voltage is deliberate and not a result of transient noise. (Illustrative debounce intervals may be in the 40-80 microsecond range.)

With the lapse of the debounce interval, the sensor controller decodes the command and takes control of the I/O line for a predetermined interval 401 that may depend on the command. For a "send and receive" command, the sensor controller begins the predetermined interval 401 with the transmission of an acoustic burst 402 and retains control until a programmed measurement interval has elapsed. Before discussing the operation of the I/O line during this measurement interval 401, we consider the operation of the piezoelectric transducer and the corresponding amplified receive signal RX.

The operation of the piezoelectric transducer is here represented as a vibration signal VIBR representing mechanical oscillation of the piezoelectric element. (Note that the signal is not shown to scale, as the transmitted burst 402 may be orders of magnitude larger than the echo 410.) Electrically, the mechanical vibration of the piezoelectric element can be detected as a voltage or a current. The mechanical vibration amplitude increases as the controller 302 drives the transducer (the "driving stage" 404), then decreases after the driving operation is concluded (the "reverberation stage" 406). The controller 302 may employ active and/or passive damping to reduce the duration of the reverberation stage.

Figure 3:
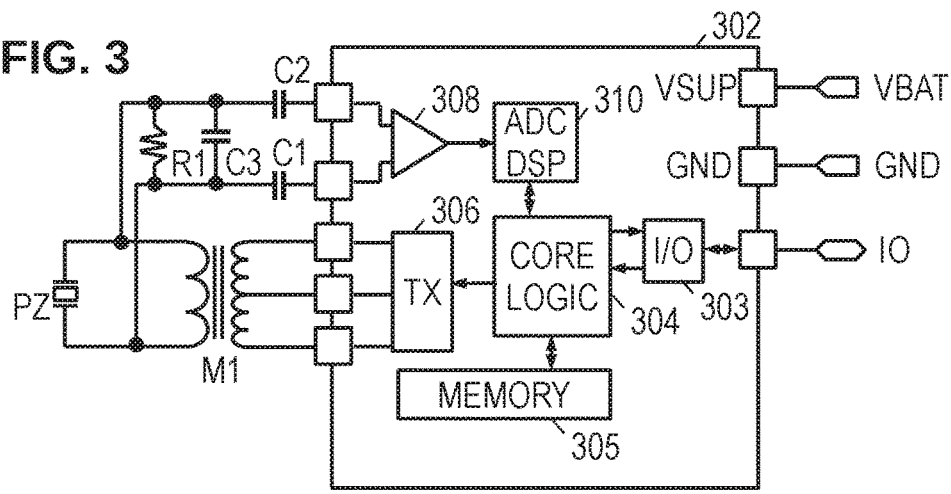
FIG. 3 is a circuit schematic of an illustrative parking-assist sensor.

In the sensor embodiment of FIG. 3, the vibration is detected as a clamped, amplified version of the secondary voltage VX via amplifier 308. For explanatory purposes the RX signal illustrated in FIG. 4 is an envelope of this clamped, amplified voltage signal, but the amplified oscillatory signal can also be employed.

The sensor controller measures a noise level during a pre-transmit period 403, which may begin one debounce interval after the ECU asserts the I/O line and may end when the transmit burst is sent. The actuation of the transducer for the transmit burst causes the RX signal to saturate. (In at least some implementations, internal voltage clamps on the receive terminals of the sensor controller prevent excessive voltages from reaching amplifier 308). The transmit burst overwhelms the receiver and prevents any meaningful echo measurements from being acquired during this interval. While the receive signal is above a threshold 411 (and/or compliant with other implementation-specific requirements that aren't relevant here), the sensor controller drives the I/O line low. Thus, the controller asserts the IO signal during the actuation interval $T_{TX}$, which corresponds to the interval 412 where the RX signal exceeds the threshold 411. This assertion during the transmit burst enables the ECU to measure the actuation interval ("$T_{TX}$") of the transducer, enabling it to verify operation of the transducer.

Note that the actuation interval 412 includes not only the drive stage 404 of the acoustic burst generation, but also a portion of the reverberation stage 406 of the acoustic burst. The time required for the reverberation amplitude to drop below threshold 411 is indicative of the losses in the transducer, and accordingly may be used as an indicator of the quality factor (Q). The actuation interval may be used directly, may be converted into a decay rate (potentially expressed in the form of an attenuation factor or a value for the series resistor RS in the equivalent circuit representation of the piezoelectric element), or may be combined with a resonant frequency measurement to derive a measured value for the quality factor (Q).

Once the receive signal falls below a threshold 411, it becomes possible to detect echoes, and the I/O line is de-asserted until such time as the sensor controller detects a valid echo. The requirements for a valid echo may include, e.g., a minimum time ("$T_{DLY}$") above a threshold 411, the minimum time being equal to or greater than the debounce interval $T_{DB}$. Such a requirement necessarily requires that the assertion of the I/O line in response to an echo be delayed by the minimum time $T_{DLY}$. The assertion lasts for a duration ("$T_{DET}$") equal to the detected length 414 of the echo burst. In at least some embodiments, multiple echoes may be detected and represented by respective assertions of the I/O line. At the end of the programmed measurement interval 401, the sensor controller 302 releases control of the I/O line.

With the foregoing protocol, it is possible for the ECU to detect certain sensor error conditions during measurements, but not other measurement conditions. Errors such as excessive noise, under/over-voltage conditions, and the like, might only be detected if the ECU halts the measurement sequence and takes the time to send a "data" command to probe the appropriate registers of the sensor controller. Without such probing, the ECU may inadvertently rely on unreliable measurements, yet with such probing the measurement repetition rate may become inadequate. In commonly-owned U.S. Pat. No. 9,810,778 titled "Triggered-event signaling with digital error reporting" and filed 2015 Sep. 14, which is hereby incorporated herein by reference, the sensor controller embeds digital bits during a reporting period 407 at the beginning of the actuation interval to report error conditions to the ECU. These bits may also or alternatively be employed by the sensor controller to communicate identified transducer states to the ECU. In any event, it is expected that the sensor controller will employ internal registers to store codes representing the transducer state and any detected error conditions, and that the ECU can employ a data command to retrieve this information via the I/O line.

In one contemplated embodiment, assertion during the first bit interval during reporting period 407 indicates an excessive noise level during the pre-transmit period 403, assertion during the second bit interval is asserted to indicate an acceptable reverberation period (of the preceding transmit pulse, as the measurement of the current reverberation period is not yet complete), and the third bit interval is asserted to indicate an absence any other errors (such as under/over voltage, thermal shutdown, a hardware error, power-on reset, etc.) Thus, during a successful, error-free, measurement, the I/O signal would be high during the first bit interval and low during the second and third bit intervals of the reporting period 407. However, when an error is detected, the ECU is promptly alerted to the presence of the error without any reduction in the maximum measurement repetition rate.

Figure 5:
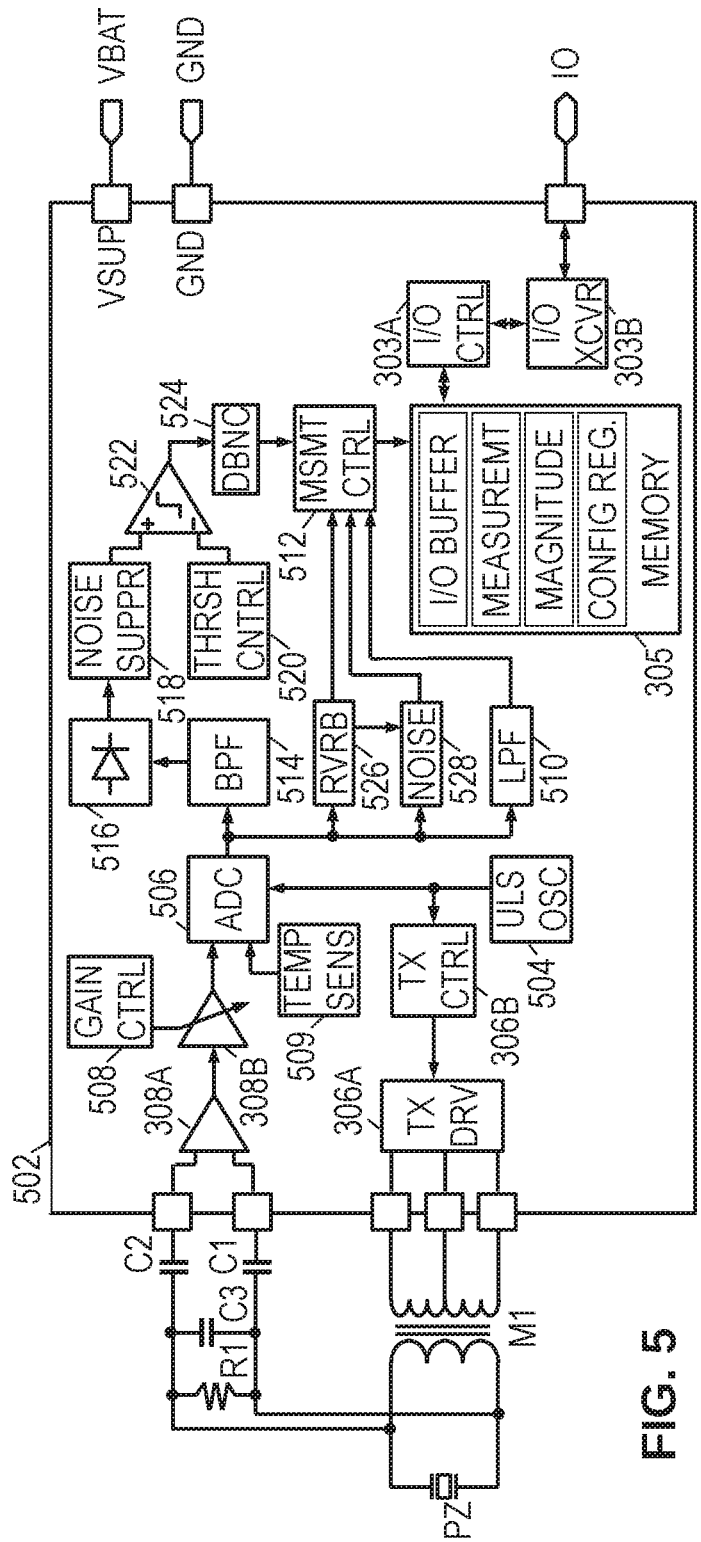
FIG. 5 is a circuit schematic of an illustrative parking-assist sensor with added detail enabling detection and reporting of noise-induced sensor blindness.

To explain a preferred noise-induced blindness technique and how it distinguishes over existing systems, we turn now to FIG. 5. FIG. 5 shows a sensor controller 502 with some additional implementation detail and some additional function blocks which may be implemented by the DSP 310 or by application specific hardware modules. We begin first with the transmit chain. An oscillator 504 generates a signal at a desired carrier frequency in the ultrasonic range. When initiated, a transmit control module 306B supplies a pulse of the carrier signal frequency to a transmit driver 306A, which responsively supplies a alternating drive voltage or current via the transformer M1 to the piezoelectric element PZ.

As previously discussed, the piezoelectric element converts the oscillating signal into a burst of ultrasonic sound that propagates away from the transducer until it encounters obstacles. The sound burst reflects from the obstacles, returning to the transducer as echoes. These, along with other sounds impinging on the piezoelectric element, are converted into an electrical receive signal that is amplified by a low noise amplifier (LNA) 308A. As the LNA typically has a fixed gain, a subsequent gain control amplifier 308B provides further amplification with a variable gain to optimize the range of the receive signal with respect to the range of the analog to digital converter 506. A gain controller 508 determines the variable gain supplied by the gain control amplifier 308B. The gain controller 508 may provide an adaptive gain to compensate for operating conditions and aging of the transducer components. Temperature compensation may also be included. In at least some embodiments, the input of ADC 506 may be multiplexed between the acoustic receive chain and other sensors such as, e.g., a temperature sensor 509. A low-pass filter (LPF) 510 may combine the measurements from the temperature sensor to obtain an averaged temperature reading.

A measurement controller 512 may periodically collect the averaged temperature reading, and as with the other measurements to be described below, the controller 512 may store the measurements in memory 305. The memory may further include one or more configuration registers for holding parameters that control the operation of the sensor controller 502. For example, the configuration register may control the carrier frequency and length of the transmitted sound bursts. Memory 305 may further track historical receive signal magnitude information for use by the gain controller 508. Finally, memory 305 may be used as an i/o buffer when the I/O controller 303A is operating in a data mode. I/O transceiver 303B senses and drives signals on the I/O line, serving as the analog interface for use by the digital I/O controller 303A.

When the ADC 506 is digitizing the acoustic receive signal from gain control amplifier 308B, it may sample the receive signal at some multiple (e.g., 4×) of the carrier frequency provided by the oscillator 504. This sampling rate, combined with bandwidth limits of the transducer and front end amplifiers 308A, 308B, mitigate against aliasing effects. A narrow bandpass filter 514 operates to extract the receive signal frequencies right around the carrier frequency. In some embodiments, the bandpass filter has an adjustable quality factor Q or bandwidth, but an illustrative value might be Q=20, which for a 50 kHz carrier frequency, would provide a bandwidth of about 2.5 kHz. In some contemplated embodiments the narrow bandpass filter is a correlator or matched filter. An envelope detector 516 extracts the narrowband envelope of the filtered receive signal. An optional noise suppressor 518 performs a nonlinear transform to suppress low-amplitude signals or, equivalently, to preferentially amplify higher-amplitude signals. The noise suppression level may be determined adaptively based on the noise level measured prior to each transmitted burst. Typically the noise level is measured at the output of the bandpass filter 514 or the envelope detector 516. If excessive noise levels are detected the sensor controller may cancel the transmission of the acoustic burst and/or may signal a sensor fault to the ECU.

A comparator 522 compares the narrowband envelope signal to a threshold provided by a threshold controller 520. The threshold controller 520 varies the threshold value, dropping the value at a rate designed to compensate for the expected attenuation caused by the increased distance traversed by later-arriving echoes. A "debounce" unit 524 may be included to ensure the envelope remains above the threshold for long enough to correspond to a genuine echo. Any excursions above the threshold that are detected as genuine echoes are passed to the measurement controller 512.

As previously mentioned, the echo amplitudes may be orders of magnitude smaller than that of the transmitted bursts. Until the burst transmission is complete and the piezoelectric element returns to a quiescent state, the LNA 308A will be saturated, i.e., with its outputs (if not also its inputs) being driven to one or the other of the voltage rails. The amplifier's behavior in this mode of operation is markedly nonlinear, rendering it unresponsive to any echo signals which may be detected during this interval. Fortunately the reverberation interval is relatively short and well-defined, enabling it to serve as an indicator of the health of the piezoelectric element. Accordingly, the sensor controller 502 includes a reverberation length detector 526 to measure the length of the reverberation interval (alone or in combination with the driving interval). In at least some implementations, the reverberation length detector counts a number of carrier frequency cycles (from the oscillator 504) from the beginning of a transmitted burst until the enveloped of the receive signal falls below a threshold within the range of the ADC 506 (e.g., 80% of the maximum digitized value). The measurement controller 512 may collect the reverberation interval length measurement once with each measurement cycle.

The inventors have observed that the LNA 308A can also be saturated in other circumstances such as high levels of environmental noise (including acoustic noise and electromagnetic noise), and that this state is unlikely to be detected with a narrowband noise measurement near the carrier frequency. Thus it might be possible for a sensor to be blinded by environmental noise without the fault being detected by the narrowband noise measurement. Accordingly, the sensor controller 502 includes a wideband noise detector 528 to detect amplifier saturation, either during the pre-transmit interval 403 or, more generally, outside of the actuation interval 412 for the piezoelectric transducer. The detector 528 may include an envelope detector to measure an envelope of the unfiltered output from the ADC. In some embodiments, the wideband envelope measurement is stored in an internal register and reported to the ECU for the ECU to make a determination as to whether the noise is excessive. In other embodiments, the detector includes a comparator to compare the wideband envelope to a threshold value (potentially taking the gain control amplifier's setting into account), and a debounce circuit to screen out transient events shorter than, say, 10% of the measurement cycle. A suitable threshold value might be 98% of the maximum digitized value.

In an alternative implementation, the wideband noise detector 528 is an analog circuit that operates directly on the output of the front-end amplifier 308A to measure the wideband envelope and to optionally detect when the amplifier is operating outside of a desired range for sensing echo signals. In at least some implementations, the analog noise detector employs an envelope detector, a low pass RC filter, and a threshold comparator. In either case, the operation of the wideband noise detector may be suppressed during the actuation period (i.e., the driving and reverberation intervals) by the reverberation detector 526.

Figure 6:
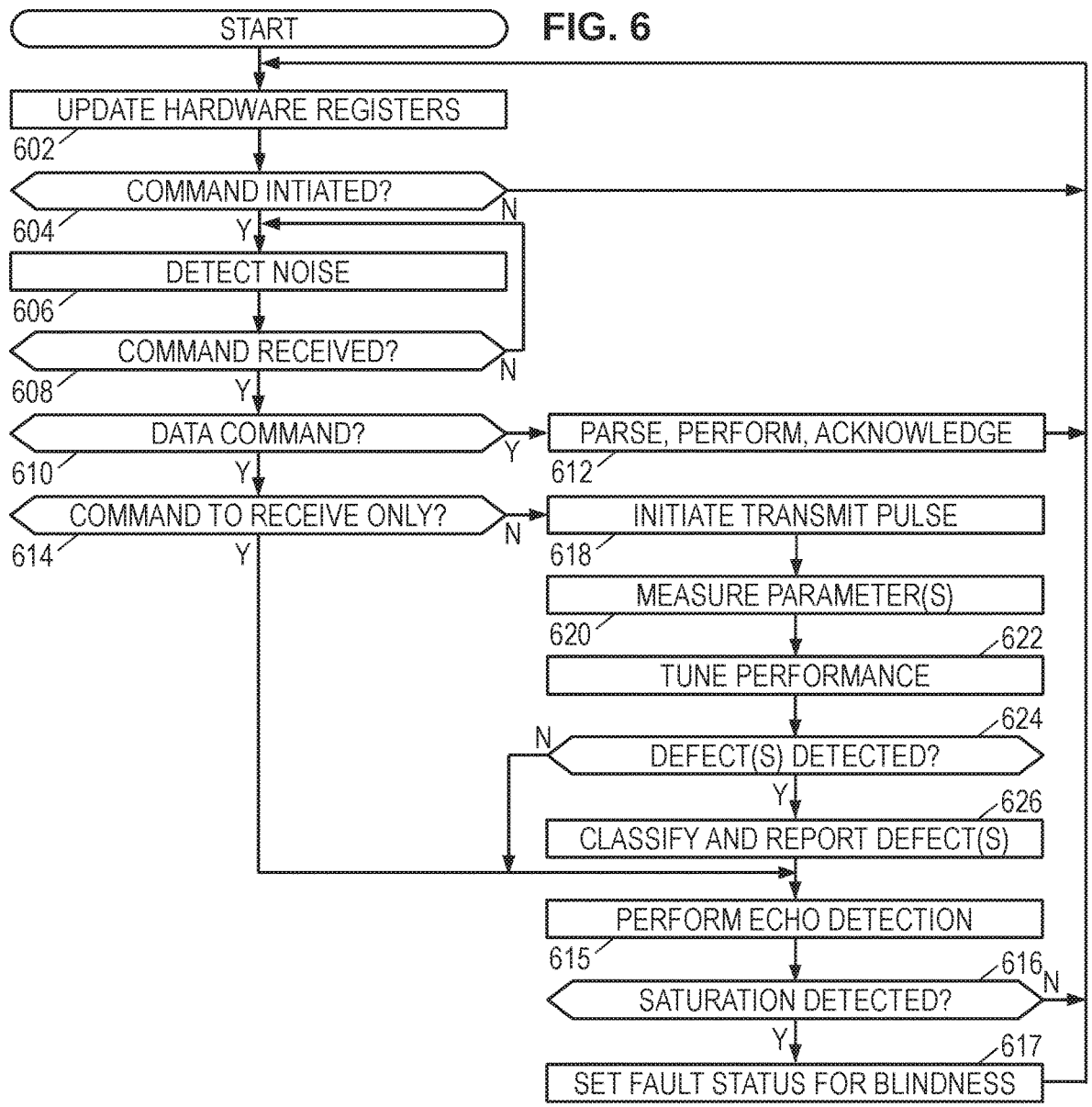
FIG. 6 is a flow diagram for an illustrative sensing method.

FIG. 6 is a flow diagram for an illustrative sensor control method. It begins in block 602 with the control logic initializing (and thereafter, updating) registers used to store codes representing the transducer state and any detected errors. These registers are reset when read by the ECU. In block 604, the control logic determines whether the ECU has asserted the I/O line to initiate a command. (As previously noted, other communication and power supply techniques are also suitable and contemplated for use.) If not, blocks 602 and 604 are repeated while the control logic awaits a command.

Upon detecting the initiation of a command, the control logic prompts the receiver to perform noise level detection in block 606. This noise-level detection may include both a narrowband and a wideband envelope measurement. In block 608, the control logic determines if the command has been fully received. If not, block 604 and 606 are repeated while the control logic awaits completion of the command.

Once the command has been fully received, the control logic determines in block 610 whether it is a "data" command. If so, the control logic 612 parses the digital command code to determine what the command is and carries it out. For example, the command may indicate that a certain value is to be written to a specified memory address, or that the contents of a specified register are to be sent to the ECU. The control logic carries out the command and signals its completion to the ECU. Once the data operations have been completed, the control logic returns to block 602.

If the command is not a data command, the control logic determines in block 614 if it is a "receive only" command. If so, the DSP performs echo detection in block 615 (driving the I/O line as described previously) and, once the measurement period elapses, the sensor controller relinquishes control of the I/O line. During the measurement period in block 615, the blindness detector monitors for saturation of the front-end amplifier as described previously. (As previously mentioned, some embodiments perform the wideband envelope measurement check in during the pre-transmit interval in block 606.) In block 616, the DSP checks to determine if the blindness detector observed any saturation events, and if not, control returns to block 602. Otherwise, in block 617 the DSP determines the status code information about this sensor fault in block 617 for storage in an internal register in block 602 and potential reporting in block 618 below. Control then returns to block 602.

If in block 614 the command is determined to be (rather than a receive-only command) a send & receive command, the control logic triggers the transmitter to send a transmit burst in block 618, taking control of the I/O line as described previously. As described in the related application, the control logic may, upon taking control of the I/O line, send a digital status word (consisting of one or more bit intervals) to the ECU. The digital status word may be derived from the codes stored in the internal registers.

In block 620, the DSP measures the piezoelectric transducer response during the driving stage and/or during the reverberation stage of the acoustic burst transmission, deriving one or more response parameters such as resonance frequency, quality factor, magnitude, phase shift, actuation interval, attenuation rate, series resistance, damping factor, etc. As described previously, the digital status word is derived from a noise level measurement and any error conditions that may be stored in the hardware registers. (In certain alternative embodiments, the response measurement and parameter determination may be decoupled from the echo-measurement operation of the sensor, such that most echo measurements are performed without measuring the response parameters. The response parameters may then be determined using the disclosed principles when needed via a dedicated command or calibration operation independent of the echo measurement process.)

In block 622, the DSP optionally adapts the driving frequency, amplitude, and/or waveform to optimize the efficiency of acoustic burst transmission. In block 624, the DSP analyzes the measured parameter(s) to detect whether they indicate that a new fault or change of transducer state has occurred. If not, the DSP performs echo detection in block 616 and drives the I/O line accordingly. Otherwise, before performing echo detection in block 616, the DSP in block 626 analyzes the measured parameters to classify any faults and identify the transducer state (e.g., normal, loaded, impeded, or defective). The status code for any such diagnosed faults or state conditions will be stored in internal registers in block 602, and may be communicated to the ECU, which in turn may alert the operator of the vehicle using a dashboard indicator or alert tone. Preferably, the operator is informed of the transducer state and provided with guidance as to whether increased caution is sufficient, whether sensor impairments should be removed, or whether a trip to a repair shop is recommended.

Though the operations shown and described in FIG. 6 are treated as being sequential for explanatory purposes, in practice the method may be carried out by multiple integrated circuit components operating concurrently and perhaps even speculatively to enable out-of-order operations. The sequential discussion is not meant to be limiting. Further, the foregoing description has presumed the use of a LIN bus, but other bus embodiments including CAN and DSI3 are contemplated, where wideband envelope measurements can be communicated directly to the ECU for the ECU to make the determination of whether the front-end saturation level renders the sensor effectively blind. Moreover, the focus of the foregoing discussions has been ultrasonic sensors, but the principles are applicable to any sensors that may be blinded with front-end saturation effects. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:
1. A controller for a piezoelectric transducer, the controller comprising:
    a transmitter to drive a piezoelectric element during actuation intervals to generate acoustic bursts;

a receiver to sense a response of the piezoelectric element to echoes of each acoustic burst, the receiver including a front-end amplifier to amplify a signal from the piezoelectric element;

a processing circuit coupled to the transmitter and to the receiver, the processing circuit operable to apply echo-detection processing to said response; and a blindness detector to detect saturation of the front-end amplifier outside of the actuation intervals, wherein the blindness detector includes: an envelope detector that measures a wideband envelope of the response outside of the actuation interval; and a comparator that compares the wideband envelope to a threshold representing saturation of the front-end amplifier.

2. The controller of claim 1, wherein the blindness detector detects saturation immediately prior to each actuation interval.

3. The controller of claim 1, further comprising: an analog-to-digital converter subsequent to the front-end amplifier, the analog-to-digital converter providing a digital response signal; a bandpass filter centered on a carrier frequency of the acoustic bursts to produce a filtered signal from the digital response signal; a second envelope detector that measures an envelope of the filtered signal during a noise measurement interval prior to each actuation interval; and a second comparator that compares the measured envelope of the filtered signal to a second threshold representing excessive environmental noise.

4. The controller of claim 3, further comprising an I/O controller that communicates a sensor fault if the blindness detector detects saturation and if the second comparator detects excessive environmental noise during the noise measurement interval.

5. The controller of claim 1, wherein the controller includes an analog-to-digital converter subsequent to the front-end amplifier, the analog-to-digital converter providing a digital response signal; and wherein the blindness detector operates on the digital response signal.

6. The controller of claim 1, wherein the controller includes an analog-to-digital converter subsequent to the front-end amplifier, the analog-to-digital converter providing a digital response signal; and wherein the blindness detector operates on an analog output signal from the front-end amplifier.

7. A method of operating a piezoelectric-based sensor, the method comprising: driving a piezoelectric transducer to generate a burst of acoustic energy during an actuation interval; during a measurement interval following the actuation interval, obtaining a response of the piezoelectric transducer with a receiver that includes a front-end amplifier coupled to the piezoelectric transducer; processing the response to sense echoes of the burst; and determining whether the response indicates sensor blindness during the measurement interval due to saturation of the front-end amplifier, wherein said determining further includes: measuring a wideband envelope of the response; and comparing the wideband envelope to a threshold representing saturation of the front-end amplifier.

8. The method of claim 7, wherein said determining includes employing a reverberation detector to signal an end of the actuation interval.

9. The method of claim 7, wherein said processing includes: digitizing an output of the front-end filter with optional gain control to obtain a digital response signal; measuring a narrowband envelope of the digital response signal during a noise measurement interval prior to the actuation interval; comparing the narrowband envelope to a threshold representing excessive environmental noise.

10. The method of claim 8, wherein said determining includes:

measuring a wideband envelope of the response; and communicating the wideband envelope measurement to a system controller for detection of sensor blindness.

11. The method of claim 7, wherein the wideband envelope is measured from the response at an output of the front-end amplifier.

12. The method of claim 9, wherein the wideband envelope is measured from the digital response signal.

13. A sensor that comprises: a piezoelectric transducer; and a controller that drives the piezoelectric transducer to generate bursts of acoustic energy during actuation intervals and that obtains responses of the piezoelectric transducer during measurement intervals with a receiver that includes a front-end amplifier coupled to the piezoelectric transducer, the controller including a blindness detector that detects saturation of the front-end amplifier outside of the actuation intervals, wherein the blindness detector includes: an envelope detector that measures a wideband envelope of the response during each measurement interval.

14. The sensor of claim 13, wherein the controller further includes a reverberation detector that determines a beginning of each measurement interval.

15. The sensor of claim 13, wherein the controller further includes an I/O controller that communicates a sensor fault if the blindness detector detects saturation of the front-end amplifier.

16. The sensor of claim 13, wherein the controller includes an analog-to-digital converter subsequent to the front-end amplifier, the analog-to-digital converter providing a digital response signal; and wherein the blindness detector operates on the digital response signal.

17. The sensor of claim 13, wherein the controller includes an analog-to-digital converter subsequent to the front-end amplifier, the analog-to-digital converter providing a digital response signal; and wherein the blindness detector operates on an analog output signal from the front-end amplifier.

\* \* \* \* \*